May 7, 1935. J. H. COHEN 2,000,220
SPLASH GUARD FOR VEHICLE WHEEL FENDERS
Filed April 23, 1932 2 Sheets-Sheet 2
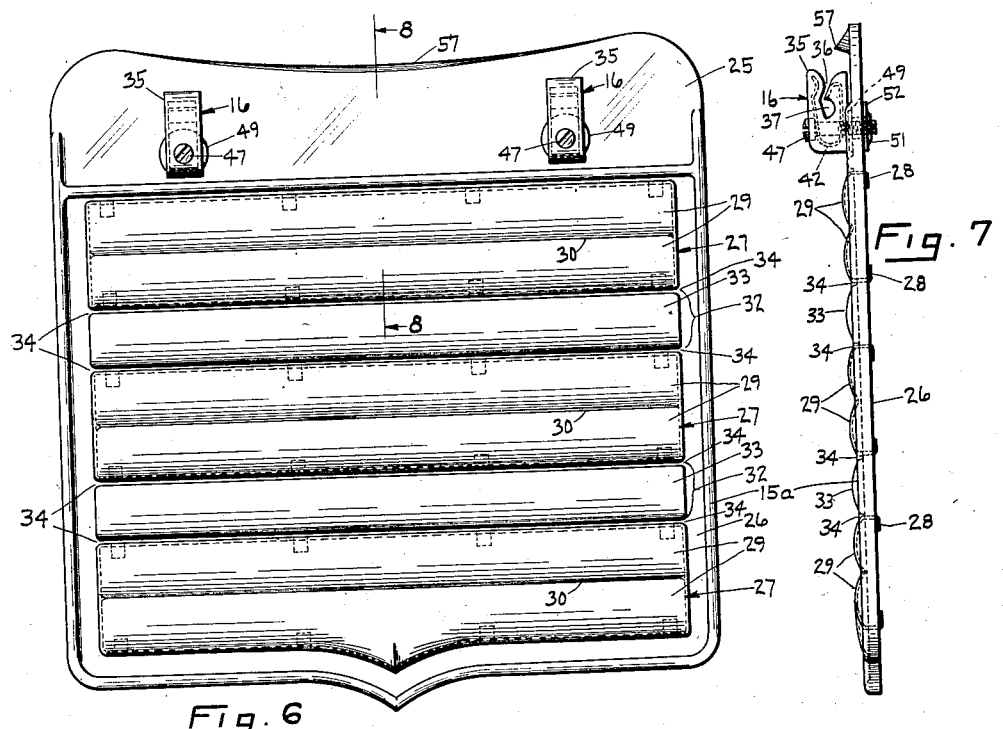
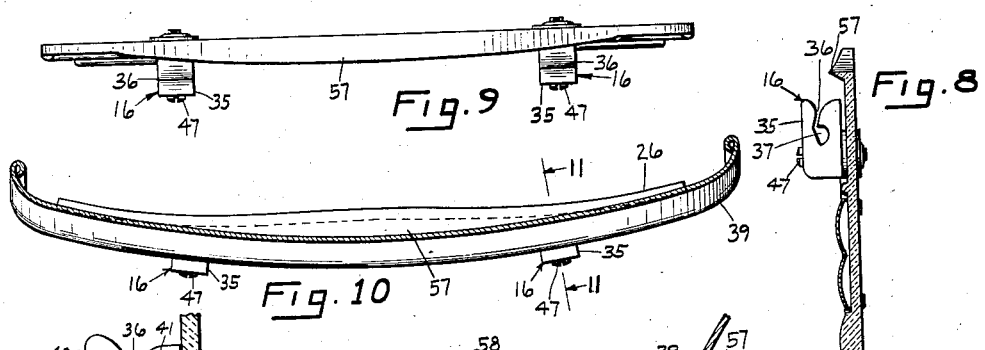
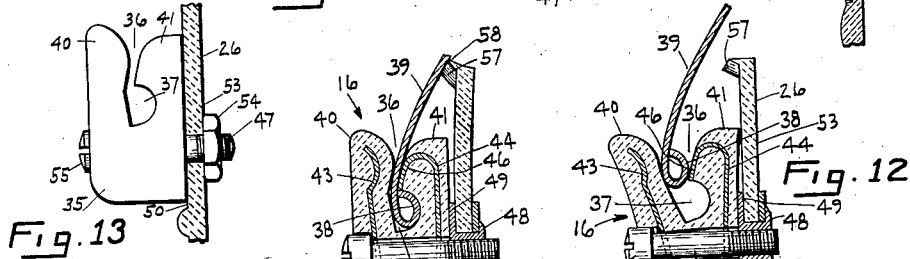
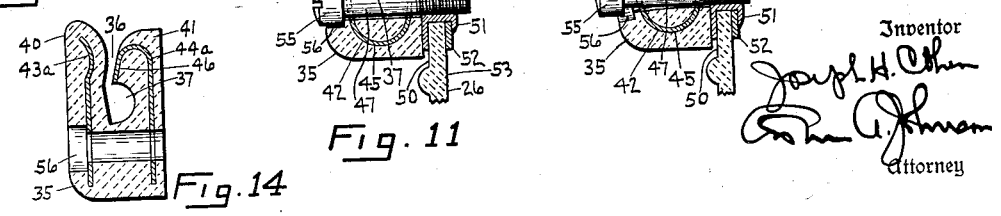
Inventor
Joseph H. Cohen
Attorney Patented May 7, 1935

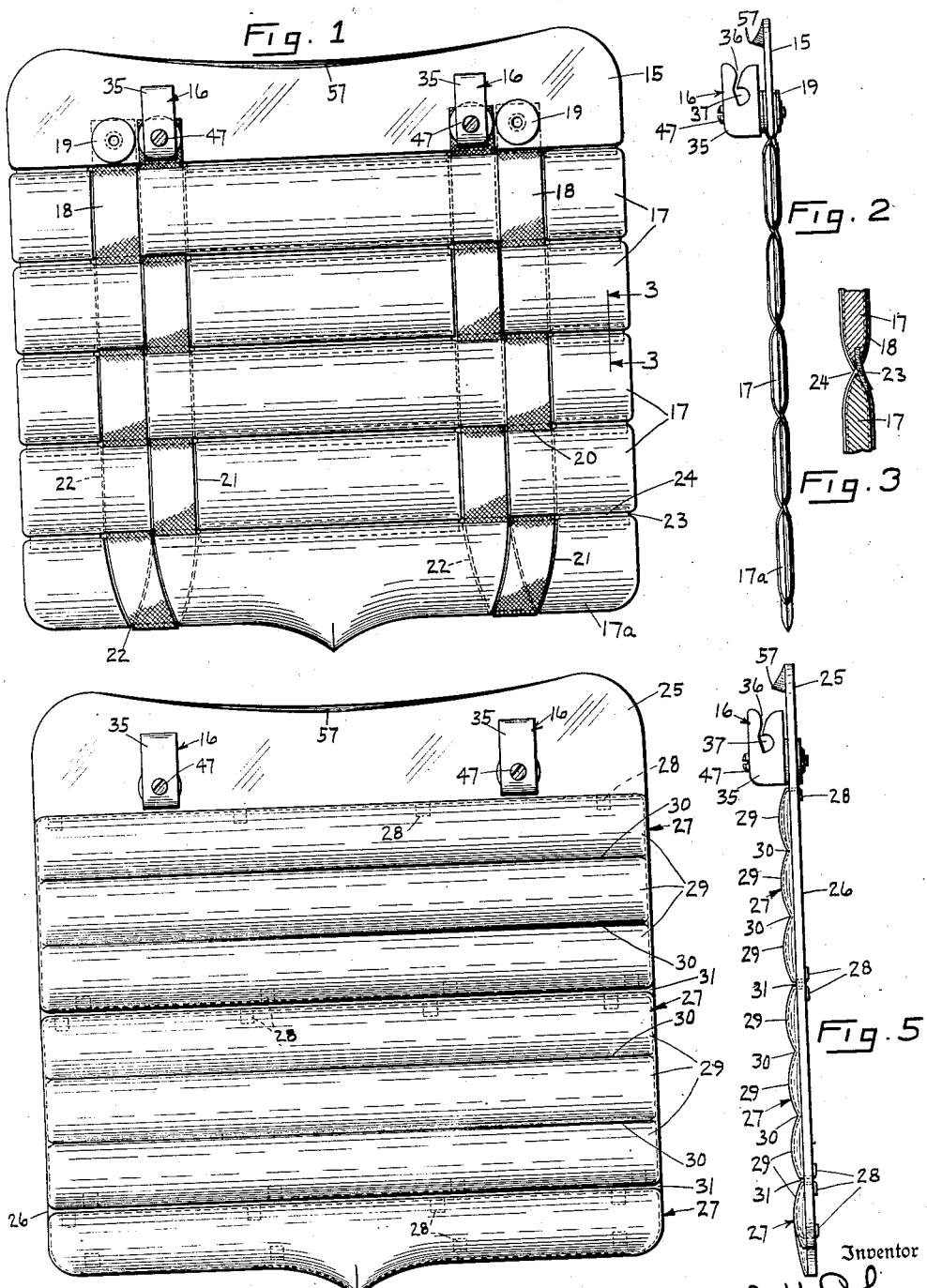

2,000,220

UNITED STATES PATENT OFFICE 2,000,220

SPLASH GUARD FOR VEHICLE WHEEL FENDERS

Joseph H. Cohen, Bridgeport, Conn.

Application April 23, 1932, Serial No. 607,125

5 Claims. (Cl. 280—152)

This invention relates to splash guards for vehicles, and especially for automobiles and other motor vehicles.

Heretofore, splash guards have been provided in the form of curtains having means whereby they are secured to the end of a wheel fender. The curtains were made of sheet rubber or like flexible material, and there was a tendency for the lower corners to curl backwardly and for the entire sheet to curl upwardly and backwardly under the influence of air streams and mud and water thrown off by the wheel with the result that such matter frequently got past the mud guard and would strike the rear bumpers and rebound against the back of the car, or, being in a finely divided state, would be sucked upwardly and forwardly against the back of the car by the partial vacuum formed there when the car is traveling swiftly. Moreover, the escaping water and mud, and even dry sand and fine gravel, would be thrown into the air and soil and damage a closely following car.

An object of the present invention is to provide a splash guard, the curtain of which is rigid and stiff enough to prevent the curling of the same and which may be located with its lower end close to the road, and in these ways avoid the disadvantages above referred to, and yet to provide one which will yield and bend up when meeting an obstruction such as a stone in its path without being damaged thereby.

This object has been realized by the present invention by making a major portion of the splash guard of metal, preferably in the form of bars so articulated that normally the curtain hangs vertically and flat from the wheel fender to which it is attached, but which, when hit by an obstruction, may be bent about one or more horizontal lines or spaces between the metal bars.

Several physical embodiments of this invention are illustrated and described herein by way of exemplifying the invention, and these include several ways of connecting the metal bars for articulation. However, it is at present preferred that this be done by mounting the bars on a flexible backing sheet, say of rubber, for, when so arranged, the articulating means not only holds the bars together for movement, but also serves to close the spaces between the bars against the passage of water and mud and to keep the bars clean and of good appearance, and largely protect the bars from the corrosive effects of the matter thrown off by the vehicle wheel.

The bars may be made ornamental and may be artistically arranged on the backing sheet, and when properly finished, enhance the appearance of the vehicle to which the splash guards are attached.

Various means have heretofore been proposed for securing splash guards to vehicle wheel fenders, but those which are easily attached and do not mar the finish of the end of the fender are likewise easily detached and liable to fall off or be stolen. These prior proposals which have been secured in place by means of tools have had the disadvantage of marring the finish of fenders to which they are attached.

Another object of this invention is to provide a splash guard having attaching means which will not mar the fender and which also is secured in place by means of a tool such as a screwdriver, and, preferably, in addition thereto, be so arranged that the splash guard when applied to the end of the fender will hold itself to the fender prior to and while being permanently secured in place, thereby permitting both hands to be used in the securing operation.

Hence, according to the present invention, the advantages of the easily attachable splash guards of previous proposals are obtained along with the advantages of those proposals where the splash guard is held on the fender positively and requires the use of tools to remove the same.

At the present time, most of the fenders of the rear wheels of the motor cars on the market and in use have concave inner surfaces at the point to which a splash guard is attached. Means to cause the splash guard to conform to this curved surface have previously been proposed, but these prior proposals have caused the curtain to be unduly bent in conforming itself to the contour of the fender. This is avoided by the present invention by the provision of a rib on the upper end of the curtain of gradually increasing height from the lateral edges toward the center and of thin cross-section so that it will deflect, if necessary, and substantially fill the space between the normal flat backing sheet of the curtain and the concave surface of the fender.

In the case of a fender of extraordinary concavity, in which case the rib provided by the present invention is not sufficient to fill the space, the upper part of the curtain being flexible will bend to bring the edge of the rib into conformity with the surface of the fender, but this will not bend the remainder and operative part of the curtain which is stiffened by the cross-bars provided by this invention.

Structure described but not claimed herein has been divided out and now forms the subject matter of divisional application Serial No. 649,278, filed December 29, 1932.

Other features and advantages will hereinafter appear.

In the accompanying drawings, which show several embodiments of the present invention as exemplary thereof—

Figure 1 is a front elevation of a splash guard, the curtain portion of which is made of horizontal metal bars.

Fig. 2 is a side elevation of the splash guard shown in Fig. 1.

Fig. 3 is a sectional view of parts of two adjoining bars shown in Fig. 1, taken on the line 3—3, Fig. 1.

Fig. 4 is a front view of another form of splash guard made in accordance with the present invention, the curtain comprising metal bars mounted on a backing sheet of rubber or the like.

Fig. 5 is a side view of the splash guard shown in Fig. 4.

Fig. 6 is a front view of another embodiment of this invention, this being the form at present preferred.

Fig. 7 is a side view of the splash guard shown in Fig. 6.

Fig. 8 is a sectional view of the splash guard shown in Fig. 6, taken on the line 8—8 thereof.

Fig. 9 is a top plan view of the splash guard shown in Fig. 6.

Fig. 10 is a sectional view of a portion of an automobile fender, showing the splash guard of the present invention applied thereto.

Fig. 11 is a sectional view of one form of clamping means of the splash guard shown in the accompanying drawings, the section being taken substantially on the line 11—11, Fig. 10.

Fig. 12 is a view similar to Fig. 11, showing the positions of the parts when the splash guard is being applied on the fender.

Fig. 13 is a view similar to Fig. 11, but of a modified form, wherein the nut member is not permanently secured to the curtain but is placed on the screw so as to engage the reverse side of the curtain.

Fig. 14 is a view similar to Fig. 11 of another modification of the clamping means, wherein the metal insert in the rubber block is made of two parts instead of one, as shown in Fig. 11.

The form of the invention shown in Figs. 1, 2 and 3 may be utilized to advantage when it is desired to have the curtain of the splash guard made almost entirely of metal. Accordingly, the splash guard shown in these figures comprises a top portion 15 having means 16 at each side adapted to engage the lower beaded edge of a vehicle wheel fender. Below the top portion 15, there is a plurality of bars 17, preferably of metal and preferably thinner than they are wide and arranged edge to edge horizontally. These bars 17 may, according to the present invention, be connected in any suitable way for articulation. As shown in Figs. 1, 2 and 3, this is accomplished by weaving flexible strips or straps 18 in and out between the bars 17 and extending over the bottom of the lowermost bar 17a and then upwardly in reverse order in and out between the bars 17. One of the ends of each strap 18 may be secured to the top portion 15 by suitable means such as an eyelet 19, while the other end may be secured to the strap under the clamping means 16. Other ways of fastening the ends of the straps will readily occur to those skilled in the art.

Preferably, there is a strap 18 at each side of the curtain and the straps are made narrow so as to allow a substantial portion of the metal bars 17 to be exposed, and when these are nicely finished by nickel or chromium plating, the splash guards enhance the appearance of the vehicle to which they are attached. It should be understood, however, that the straps 18 may be made wider and that a single wide strap may be used in place of the two narrow ones shown.

The straps may be of fabric or of metal, as desired. In any case, they should be so flexible that the bars 17 may be moved about horizontal lines or spaces between the bars. This provision is made, as above explained, so that the splash guard, when hung from the fender, may extend very close to the ground and thereby prevent the passage rearwardly of mud or water thrown up or off the vehicle wheel without the danger of a curtain being broken or damaged when meeting with an obstruction such as a stone over which or by which the wheel may have passed. Accordingly, it will be seen that the portions 20 of the straps, which are located between the bars 17, constitute pivots or fulcrum points about which the bars may move or articulate.

The bars may be grooved as at 21 and 22 for the reception of straps 18 so as to prevent the bars from slipping longitudinally out from between the straps, or the bars may be each fastened to the straps by rivets or otherwise, if desired.

The spaces between the bars 17, when arranged as shown in Figs. 1, 2 and 3, may be filled by any suitable flexible material. However, under the circumstances, it is preferable that the spaces be covered by strips 23 embedded at one end in the upper of two bars 17 and overlapping the lower of two bars, thereby forming a gasket or closure for the spaces 24 between the bars and keeping mud and water from passing through the bars.

In Figs. 4 and 5, the bars are made differently and are connected together for articulation in a different manner, which is at present considered more preferable than the arrangement shown in Fig. 1, and yet has all of the advantages of the latter. In these figures, the top portion 25 is made in one piece with a backing sheet 26 which may be made of rubber, leather, canvas, or the like, and bars 27 are connected together for articulation by being attached to the backing sheet 26. The bars 27 may be attached to the backing sheet by means of lugs 28 formed on the bars passing through the backing sheet 26 and being clinched over on the other side thereof.

When this form of the invention is employed, it is preferable that the bars 27 be made of thin sheet metal so that the splash guard will not be too heavy, and when this is done, as in the case in the form of the invention shown in Figs. 4 and 3, it is preferable that the bars be embossed to stiffen them against flexing or bending. The embossing may and preferably is so formed as to produce a succession of ribs 29 and grooves 30, which, besides mechanically stiffening the bars, also enhances their appearance.

However, it should be understood that, as in the case of the lowermost bar 27 of the curtain shown in Figs. 4 and 5, the bars 27 may be made narrow and may be made as narrow as the ribs 29 in the upper bars 27, and may be placed one above the other on the backing sheet 26 by means of lugs 28, or otherwise, so long as there are spaces 31 between the rigid arms 27 permitting the articulation of the bars relative to each other so that the curtain may be bent without breaking when meeting with an obstruction.

Moreover, the substantially rigid metal bars 27 may be spaced farther apart than shown in Figs. 4 and 5, if desired, so long as there is a sufficient number of bars of sufficient rigidity to keep the curtain substantially flat under the impact of water and mud thrown up and off the vehicle wheel.

Such an arrangement is shown in Fig. 6, in which there are three embossed bars 27, each having a pair of ribs 29 between which there is a groove 30 and having a substantial space 32 between them. This space may be left unoccupied if desired, in which case, however, it would have to be made sufficiently narrow to avoid undue bending of the curtain. However, when, as shown in Fig. 6, the space is occupied by a bar or rib 33 of rubber or other flexible material, the section of the sheet 26 carrying the bars and between the bars 27 is stiffened sufficiently to avoid undue bending of the sheet, except at the lines 34 between the metal bars 27 and the ribs 33 of rubber or the like. When this arrangement is employed and it is at present considered preferable, economy in metal bars may be effected by reason of a portion of the face of the curtain being made of rubber or other material, but when the backing sheet 26 is made of rubber, especially when it is to be molded and provided with ornamentation such as the beading 15a, it is convenient and advantageous to mold the sheet 26 with the ribs 33 therein.

While the ribs 33 (which, as above stated, may be formed with the backing sheet 26 when molding the same) tend to stiffen the curtain against bending movements about horizontal axes, they are not relied upon in the form of the invention shown in Fig. 6 to stiffen the curtain against bending movement about vertical or inclined axes, although they might be made, in accordance with the present invention, of such dimensions and shape as to do this.

Should the curtain shown in Fig. 6 meet with an obstruction such as a stone, it would flex about horizontal lines or spaces 34 between the bars 27 and the ribs 33.

The splash guard of the present invention is provided with improved means 16 for attaching the same to the end of a vehicle wheel fender. This means, as shown in detail in Figs. 11 to 14, preferably comprises a block of rubber 35 having a vertical slot 36 and a transversely extending hole 37, the slot permitting a bead 38 on the lower end of a fender 39, see Fig. 12, to enter the transverse hole 37, the portions 40 and 41 of the block spreading, as shown in Fig. 12, to permit this to occur. When the bead 38 is located in the hole 37, as shown in Fig. 11, the portions 40 and 41 of the block spring together again and close the slot against the passage of the bead 38. The block of rubber is attached to the curtain in a manner hereinafter referred to and constitutes, in the form shown, a quick and easy means for attaching the splash guard to the fender, for it is merely necessary to force the rubber block 35 over the bead end of the fender.

However, it would be likewise easily removed, and might fall off or easily be pulled off in case someone desired to steal it. Consequently, the resiliency of the parts 40 and 41 of the block are not relied upon, according to the present invention, to secure the splash guard to the fender, but this is accomplished by more positive and permanent means.

As shown in Figs. 11 and 12, this is done by providing with the rubber block 35 a U-shaped clamp 42 comprising a pair of legs 43 and 44 connected by a cross-piece 45. The U-shaped clamp 42 may be provided externally of the block of rubber 35 if desired, but, in order that the finish of the fender 39 will not be marred by its application, it is preferable that the U-shaped clamp be embedded in the rubber block as shown in Figs. 11 and 12, and when this is done, the leg 44 is provided with a downwardly bent portion 46 to engage the inner surface of the fender directly over the bead 38. This leg 44 may extend to the exterior of the block and directly engage the inner surface of the fender, for it is not so important that that portion of the fender have its finish protected against damage.

The clamp 42 is preferably made of resilient material and is normally biased so as to urge the parts 40 and 41 of the rubber block together, this augmenting the natural resiliency of the rubber block.

The U-shaped clamp 42 is provided with a screw 47 passing through holes in the legs 43 and 44 of the clamp and entering a nut member 48 which may be formed with a flange 49 engaging the front surface 50 of the curtain and may have its inner portion peened over to form a flange 51 engaging a washer 52 against the reverse surface 53 of the sheet 26.

However, as shown in Fig. 13, a loose nut 54 may be applied to the rear end of the screw 47 so as to engage the reverse surface 53 of the sheet 26.

The screw 47 is provided with a head 55 so that when the screw is turned it will engage the rubber block or, as preferred and as shown, will directly engage the leg 43 of the clamp 42, the block being provided with a hole 56 to receive the head of the screw.

When the splash guard is to be attached to the end of the fender, the screw 47 is loosened as shown in Fig. 12, in which condition it permits the arm 43 of the clamp and the part 40 of the block to spring outwardly when the bead 38 is forced downwardly through the slot 36 in the hole 37. Upon receiving the bead in the hole, the leg 43 will spring back toward the leg 44 and thus close the slot and hold the block of rubber and curtain to the fender. The screw 47 is then tightened and in being tightened engages the leg 43 and draws the legs 43 and 44 together, the leg 44 being backed by the flange 49 and/or the sheet 26 and nut 54, according to the construction employed. This causes the end of the fender and the bead thereon to be firmly and positively gripped by the attaching means 16 and prevents the separation of the legs 43 and 44 to such an extent as would permit the splash guard to be pulled off the fender.

The bent-over portion 46 on the leg 44 of the U-shaped clamp constitutes a hook and, engaging over the bead 38 of the fender 39, positively holds the attaching means 16 and the curtain to the fender, in contradistinction to merely holding it thereby friction.

In order to remove the splash guard from the fender, it is necessary to employ a screwdriver and loosen the screws 47. Of course, it should be understood that there are preferably two attaching means 16, one located at each side of the splash guard, although a larger number may be employed, if desired.

Instead of the U-shaped clamp 44 having a connecting part 45, it may be arranged as shown in Fig. 14, where the legs 43a and 44a are separate and are embedded in the rubber block 35.

On most motor cars, and particularly automobiles now on the market and in use, the fender is provided with a concave inner surface, and it is preferred that the splash guard be so attached to the fender that the top portion 15 or 25 be located under the fender. In order to close the spaces between the concave inner surface of the fender and the normally flat top portion of the splash guard, it has been proposed heretofore to provide means tending to force the top portion of the splash guard into contact with the fender. This causes the top part of the splash guard to be bowed and not to hang straight down from the fender.

To avoid this, the present invention provides on the top portion 15 or 25 of the sheet 26, a rib 57 which is convex and made in such form as to fit the curvature of the most concave fenders and fill the gap, as indicated at 58 in Fig. 11, between the flat curtain and concave fender. Should the fender be not so concave as the rib 57 is convex, the rib will cause the central portion of the top portion 15 or 25 to be deflected backwardly slightly, as shown in Fig. 10. The rib 57 is made thin enough so as to flex back over any slight obstruction, such as a rivet head or the like.

When so arranged, the rib 57 forms a seal against the surface of the fender and thereby prevents water and mud from flowing down over the obverse face of the splash guard, keeping the bars clean and protected from the frequently corrosive effect of water and mud, and in good appearance.

As has been indicated, variations and modifications may be made within the scope of this invention, and portions of the improvements may be used without others.

Having thus described the invention, what is claimed as new and for which it is desired to obtain Letters Patent, is:—

1. A splash guard for a vehicle wheel comprising a plurality of relatively rigid bars disposed horizontally; a sheet of rubber for connecting the bars together one above the other in a vertical plane, said sheet being flexible to permit relative movement between the bars when engaged by an obstruction; and means carried by the sheet for attaching the latter in position to hang from a vehicle-wheel fender.

2. A splash guard for a vehicle wheel comprising a sheet of flexible material; means adjacent the top of the sheet for attaching the same to the concavo-convex end of a vehicle-wheel fender so as to hang therefrom; and a rib projecting from the obverse side of the sheet adjacent the top thereof and adapted to contact with the concave surface of the fender and fill the space between the top of the sheet and the said concave surface of the fender and prevent mud and water from flowing from the fender over the obverse side of the splash guard.

3. A splash guard for a vehicle wheel comprising a sheet of flexible material; means for attaching the same to the end of a vehicle-wheel fender so as to hang therefrom; and stiffening bars on said sheet extending horizontally thereof and alternating with horizontal lines of flexibility so that the sheet may bend on said lines when meeting with an obstruction.

4. A splash guard for a vehicle wheel comprising a sheet of flexible material; means at the top of the sheet for attaching the same to the end of a concavo-convex surface of a vehicle-wheel fender so as to hang therefrom; and means at the top of the sheet extending transversely across the sheet and projecting therefrom to fill the space between the top of the sheet and the adjacent concave surface of the fender to prevent mud and water from flowing from the fender over the obverse side of the splash guard.

5. A splash guard for a vehicle wheel comprising a sheet of flexible material; means for attaching the same to the end of a vehicle wheel fender so as to hang therefrom; relatively rigid stiffening bars on said sheet extending horizontally thereof; and relatively flexible stiffening bars disposed between said relatively rigid stiffening bars, said bars being spaced from each other to provide horizontal lines of flexibility so that the sheet may bend on said lines when meeting with an obstruction.

JOSEPH H. COHEN.